Jan. 2, 1945.　　　　E. C. HARTLEY　　　　2,366,257
　　　　　　　HAND OPERATED TUBE CUTTER
　　　　　　　　Filed Nov. 9, 1943　　　3 Sheets-Sheet 3

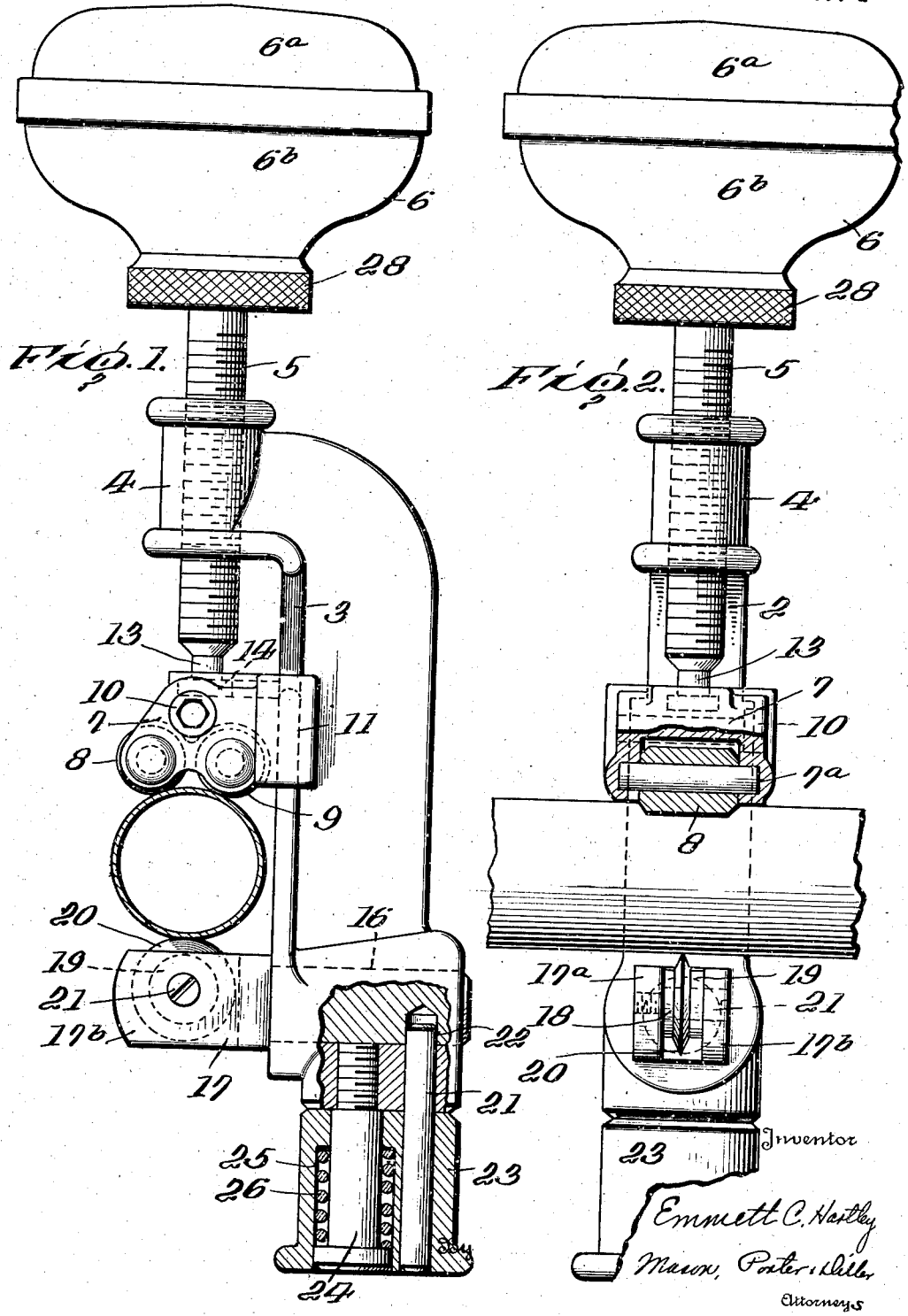

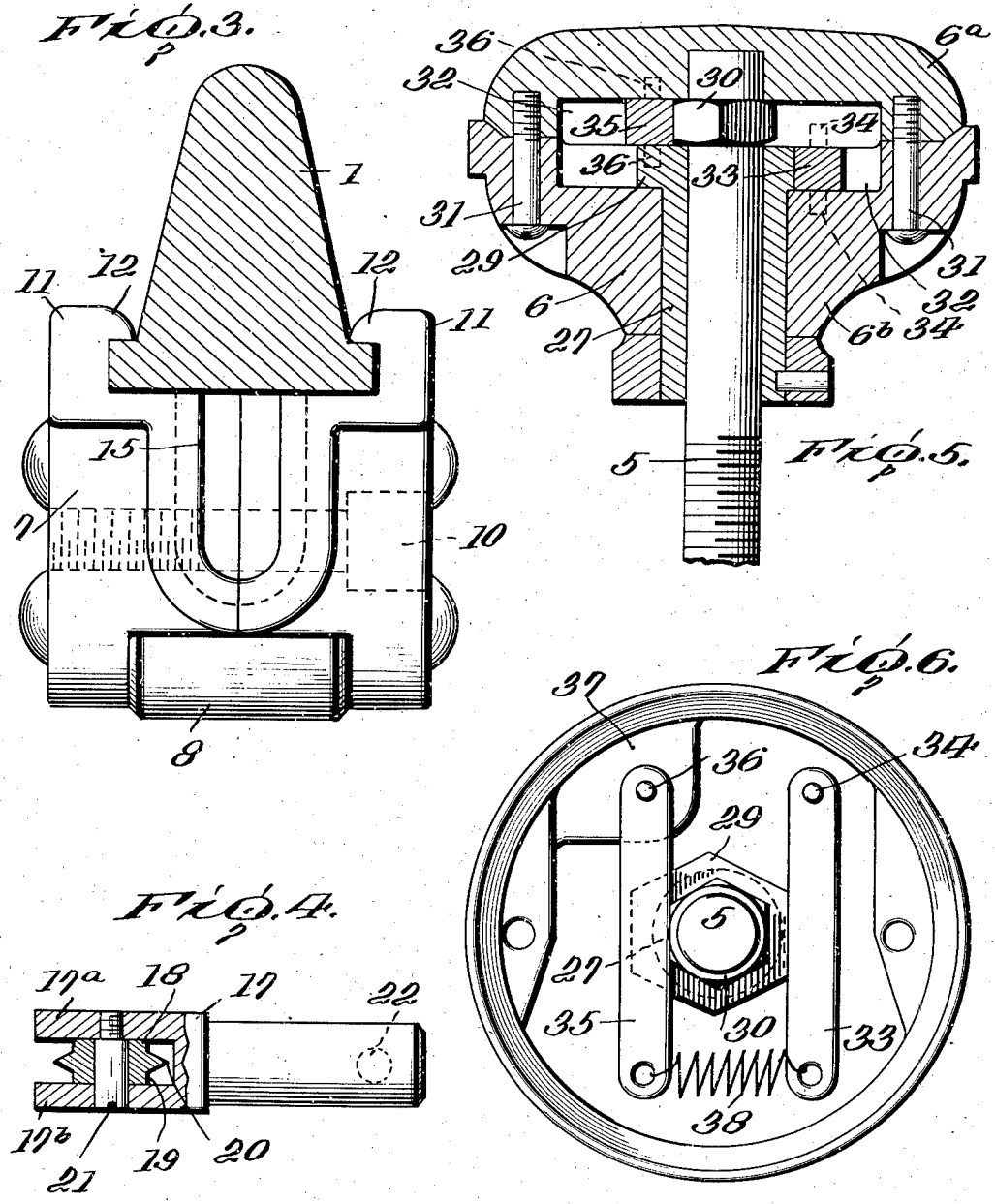

Inventor
Emmett C. Hartley
By Mason, Porter & Diller
Attorneys

Patented Jan. 2, 1945

2,366,257

UNITED STATES PATENT OFFICE 2,366,257

HAND-OPERATED TUBE CUTTER

Emmett C. Hartley, Cleveland, Ohio, assignor to The Parker Appliance Company, Cleveland, Ohio, a corporation of Ohio Application November 9, 1943, Serial No. 509,639

5 Claims. (Cl. 30—102)

The invention relates to new and useful improvements in a hand-operated tube cutting tool, and more particularly to a tube cutting tool of the type wherein the tube is held stationary and the cutting tool is rotated about the tube for the cutting of the same.

An object of the invention is to provide a cutting tool having a supporting frame on which feed rollers are slidably supported with a support for a rotary cutting wheel, which support is detachably connected to the supporting frame so that the cutting wheel may be readily removed from the tool.

A further object of the invention is to provide a tube cutting tool of the above type with a feed screw for moving the feed rollers into contact with the tube for progressively pressing the tube against the cutting wheel.

A still further object of the invention is to provide a knob for turning the feed screw, which is so connected to the feed screw that when a predetermined turning torque is applied to the knob, the knob will be released from the feed screw so that further advancing of the feed screw ceases.

In the drawings, which show by way of illustration one embodiment of the invention, Figure 1 is a front view of the tube cutting tool.

Figure 2 is a side elevation of the same with parts broken away.

Figure 3 is a plan view of the carrier for the feed wheels showing the frame in section.

Figure 4 is a plan view of the cutter and the supporting member therefor on an enlarged scale.

Figure 5 is a vertical sectional view through the turning knob showing the yieldable connection between the knob and the feed screw.

Figure 6 is a plan view of the knob with the cap removed to show the yielding connection between the knob and the feed shaft.

Figure 7:
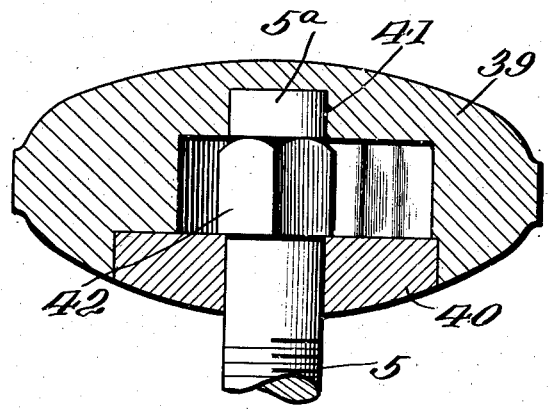
Figure 7 is a vertical sectional view through a modified form of turning knob.

The improved tube cutting tool includes a supporting frame 1 having projecting ribs 2, 2 extending along one longitudinal side of the supporting frame. Said ribs are cut away as indicated at 3, for the purpose which will be described later. The supporting frame has a laterally projecting portion 4 provided with a bore which is threaded to receive a feed screw 5. The threaded feature is only illustrated diagrammatically. Attached to the upper end of the feed screw is a knob 6 for turning the feed screw.

Mounted for reciprocation on the ribs of the supporting frame is a carrier 7. Mounted in this carrier 7 are two feed rollers 8 and 9. The carrier is made in two sections which are secured together by a bolt 10. Each section is provided with recesses 7a. The roller 8 turns freely on a pin 8a which is mounted in the recesses 7a at the ends of said roller. The roller 9 is mounted in a similar manner. The carrier has laterally projecting members 11, 11, which are formed with inwardly extending parts 12, 12. This provides a recess for the supporting frame 1 and the ribs 2, 2, as shown in Fig. 3. The carrier is free to slide up and down on these ribs. When the carrier is raised to the extreme upper position, then the inwardly extending parts 12, 12 are brought into register with the cut-away portions 3, 3 in the ribs, and the carrier can be moved laterally to the left, as viewed in Figure 1, and thus detached from the frame.

The feed screw 5 is provided with a reduced neck portion 13 carrying a head 14, which engages a recess 15 in the carrier 7. This recess is open at the rear side and therefore the carrier when moved laterally will be detached from the head.

The frame at the lower end thereof is slightly enlarged, and is provided with a cylindrical bore 16. Mounted in this bore is a supporting member 17 which carries a rotatable cutting wheel for cutting the tube. Said support at its free end is generally rectangular and is bifurcated so as to provide two parallel horizontally projecting arms 17a and 17b between which the cutting wheel 18 is mounted. Said cutting wheel includes a cylindrical portion 19 having a V-shaped projecting cutting edge 20 extending circumferentially thereabout. This cutting wheel is mounted for rotation on a stud 21 which passes through one arm and is threaded into the other. By removing the stud the cutting wheel can be removed or replaced with another.

The support for the cutting wheel fits within the bore 16 and is held therein by a locking pin 21. This locking pin extends into a recess 22 in the support and not only prevents longitudinal movement of the support in the bore but also prevents rotative movement thereof. The pin 21 is connected to an operating member 23 which is mounted on a headed bolt 24 threaded into the bottom end of the supporting frame 1. There is a recess 25 in this operating member and disposed in the recess is a spring 26 which bears against the head end of the bolt and also an abutment shoulder on the operating member 23. When it is desired to remove the cutter support, this operating member is grasped and moved away from the bottom end of the support 1 so that the locking pin is withdrawn from the recess 22. The spring normally holds the locking pin in engagement with the recess when the operating member is released.

The feed screw 5 is operated by a knob 6 made in two sections 6a and 6b. The section 6b has a bore therethrough in which a sleeve bushing 27 is mounted. At the lower end of the section 6b is a collar 28 which is pinned to the bushing. The bushing has a projecting flange 29 at its upper end which is provided with flat sides. As herein shown, there are six flat sides on the flange. This bushing is mounted for free rotation on the feed screw 5 and is frictionally held in a set position on the knob. The feed screw extends above the flange, and the projecting end thereof is journalled in the upper section 6b of the knob. Adjacent the journalled end is a collar 30 which has flat sides. As illustrated in the drawings, there are six flat sides. This collar is an integral part of the feed screw.

The upper section 6a of the knob is in a measure a cap plate for the knob and is secured thereto by screws 31, 31. Both the upper and lower sections of the knob are recessed, as indicated at 32. The flange on the bushing and the collar 30 on the feed screw are located in this recess. A lever arm 33 is provided with trunnions 34 projecting from the opposite sides of the lever. The lower trunnion is mounted in the lower section 6b of the knob, and the upper trunnion is mounted on a depending lug carried by the upper section 6a of the knob. This lever 33 is so disposed as to make contact with the flat sides of the flange of the bushing.

A lever 35 is provided with projecting trunnions 36, one of which is mounted in the upper section 6a of the knob and the other mounted in a projecting lug 37 rigid with the lower section 6b of the knob. This lever 35 is so disposed as to bear against the flat sides of the collar 30. The free end of the lever 35 is bent downward and the free end of the lever 33 is bent upward. A tension spring 38 joins the ends of the levers and presses said levers against the flat sides respectively of the flange on the bushing and the collar on the feed screw.

The lever 33 is in a sense an abutment lever. The flange 29 which carries the flat sides contacting with the lever 33 is eccentric, as shown in Fig. 6. When it is desired to increase the tension of the spring 38, then the collar 28, which is attached to the bushing, is turned so as to bring a flat side of the flange of greater radial length into position for engagement with the lever 33. There are four flat sides which are spaced at different distances from the center of the feed screw and by bringing selectively one of these flat sides into engagement with the lever 33, four different tensions can be provided for the spring 38.

The spring 38 holds the arm 35 in contact with the flat faces of the collar 30. When the pressure of the feed screw reaches a desired maximum, then the lever 35 will yield and the knob will turn on the collar 30 without imparting any turning movement to the collar or feed screw 5. The tension on the spring 38 is preferably adjusted so that by turning the knob, the feed screw can be advanced to press the tube against the cutter for the proper cutting feed, and if a turning torque greater than that desired is applied to the knob, it will merely turn on the feed screw.

After the tube has been placed on the cutter, the knob is turned so as to actuate the feed screw to bring the feed rolls into contact with the tube. The knob is given an increment of turning movement so as to create a slight pressure of the feed rolls against the tube, and this will force the tube against the cutting wheel. The hand cutting tool is turned about the center of the tube as an axis. This causes the cutting wheel to circumferentially travel around the tube, due to the fact that the tube is held by some suitable means against rotation.

After the cutting wheel has passed around the tube, the knob is given a further increment of turning movement so as to force the tube against the cutter and then the feed rollers may be operated to progressively press the tube against the cutting wheel until the tube is cut all the way through.

As noted above, if the pressure applied to the knob for turning the feed screw is above a predetermined set torque, then the connection between the knob and the feed screw will yield and the knob will turn on the feed screw without turning the same. This insures that the feeding of the tube against the cutter wheel will not be too rapid so as to diametrically deform the tube, or so as to injure the cutter or require too great a stress in the manual turning of the cutting tool about the tube.

In Figure 7 there is shown a modified form of knob for turning the feed screw. The knob includes an outer section 39 and an inner section of plug 40. The feed shaft 5 extends through the plug 40 and the upper end 5a thereof is seated in a recess 41 in the upper section 39 of the knob. The upper section of the knob can turn freely on this section 41, if not other wise restrained. The feed shaft 5 has a section 42 therein which is provided with flat sides. As herein shown, this section has six sides. The knob section 39 is provided with a recess 43 adapted to receive the end of a flat spring 44. This flat spring 44 intermediate its ends engages the section 42. An adjustable screw 45 is threaded into the knob 39 and bears at 46 against the free end of the spring 44. By adjusting this screw, the tension of the spring against the section 42 can be varied.

Figure 8:
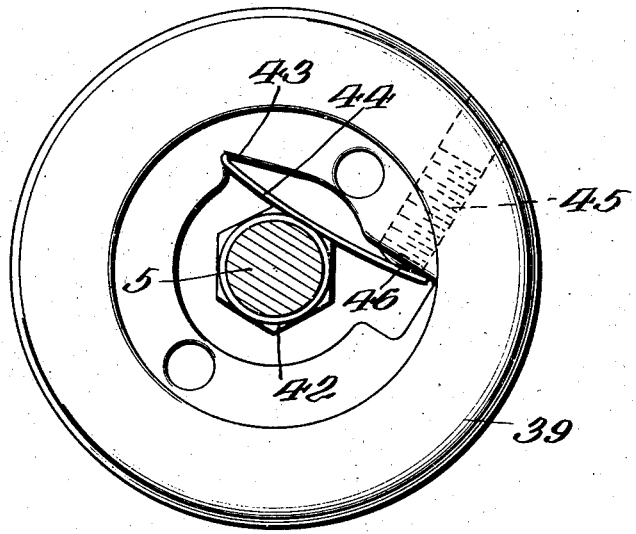
Figure 8 is a bottom plan view of the knob with the plug removed.

When the parts are in the position shown in Fig. 8, the spring is engaging a flat side of the section 42 and the feed shaft will be turned by the turning of the knob. If the turning torque applied to the knob during the cutting operation becomes excessive, then the spring 44 will flex and the knob will turn around the section 42 instead of rotating the same. The manner of yielding is very similar to that described in connection with Figs. 5 and 6.

While two forms of yielding means are shown whereby the rotation of the knob is imparted to the feed shaft, it will be understood that other ways may be devised for accomplishing this purpose.

It may be desirable at times to change the feed rollers for a different spacing of the rollers. This can be readily accomplished by turning the feed screw so as to move the carrier to the upper end of the frame and then it can be moved laterally and released both from the frame and the feeding screw, and another carrier substituted therefor with a different spacing of feed rollers.

It is obvious that many changes in the details of construction may be made without departing from the spirit of the invention as set forth in the appended claims.

I claim:

1. A tube cutting tool comprising a supporting frame, a rotary cutter mounted on said frame, a tube engaging member mounted on said frame opposed to said cutter and means for moving said cutter and said tube engaging member relative to each other including a feed screw mounted in said frame, a knob and yielding means connecting the knob to said screw for turning the same, including a flat sided collar carried by the feed screw and a yieldable member carried by the knob and adapted to engage a flat side of the collar for turning the feed screw, said yieldable member being adapted to release the knob from the feed screw when the turning torque applied to the knob reaches a predetermined degree.

2. A tube cutting tool comprising a supporting frame, a said frame having a projecting support for a cutting wheel, a cutting wheel rotatively mounted at the outer end of said support, a carrier mounted for reciprocation on said frame, feed rollers mounted on the carrier and adapted to engage a tube for feeding the same to the cutting wheel, a feed screw for reciprocating said carrier, a knob, yieldable means connecting the knob to the feed screw for turning the same, including, a flat-sided collar carried by the feed screw, and a yieldable member carried by the knob and adapted to engage a flat side of the collar for turning the feed screw, said yieldable member being adapted to release the knob from the feed screw when the turning torque applied to the knob reaches a predetermined degree.

3. A tube cutting tool comprising a supporting frame, said frame having a projecting support for a cutting wheel, a cutting wheel rotatively mounted at the outer end of said support, a carrier mounted for reciprocation on said frame, feed rollers mounted on the carrier and adapted to engage a tube for feeding the same to the cutting wheel, a feed screw for reciprocating said carrier, a knob, a flat-sided collar carried by the feed screw, a lever pivoted to the knob and rotatable therewith and adapted to engage a flat side of the collar, a spring for pressing said lever against the flat side of the collar, said lever being adapted to release the knob from the feed screw when a predetermined turning torque is applied to the knob.

4. A tube cutting tool comprising a supporting frame, said frame having a projecting support for a cutting wheel, a cutting wheel rotatively mounted at the outer end of said support, a carrier mounted for reciprocation on said frame, feed rollers mounted on the carrier and adapted to engage a tube for feeding the same to the cutting wheel, a feed screw for reciprocating said carrier, a knob, a flat-sided collar carried by the feed screw, a lever pivoted to the knob and rotatable therewith and adapted to engage a flat side of the collar, a spring for pressing said lever against the flat side of the collar, said lever being adapted to release the knob from the feed screw when a predetermined turning torque is applied to the knob, a second lever pivotally carried by the knob and turning therewith and serving as an abutment support for said spring, a bushing sleeve mounted in said knob and having a flange provided with flat sides eccentrically disposed relative to the bushing, said second named lever being adapted to engage a flat side on the bushing flange, and means whereby said bushing may be turned to different set positions in said knob for shifting said abutment supporting lever so as to vary the tension on the spring holding the first-named lever in contact with the flat sides of the collar on the feed screw.

5. A tube cutting tool comprising a supporting frame, said frame having a projecting support for a cutting wheel, a cutting wheel rotatively mounted at the outer end of said support, a carrier mounted for reciprocation on said frame, feed rollers mounted on the carrier and adapted to engage a tube for feeding the same to the cutting wheel, a feed screw for reciprocating said carrier, a knob, a flat-sided member carried by the feed screw, a flat spring mounted in the knob and engaging said flat-sided member for turning the feed screw, and means for adjusting the tension of the flat spring against said flat-sided member.

EMMETT C. HARTLEY.